UNITED STATES PATENT OFFICE.

EDUARD RIETZ, OF SÃO PAULO, BRAZIL.

PROCESS FOR MANUFACTURE OF WHITE CLOUDED GLASSES, ENAMELS, AND GLAZES.

1,366,101.     Specification of Letters Patent.     Patented Jan. 18, 1921.

No Drawing.     Application filed August 22, 1919. Serial No. 319,191.

*To all whom it may concern:*

Be it known that I, EDUARD RIETZ, a subject of the German State, and resident of São Paulo, in the Republic of Brazil, have invented certain new and useful Improvements in a Process for the Manufacture of White Clouded Glasses, Enamels, and Glazes, and do hereby declare the following to be a full, clear, and exact description of the invention, such as will enable others skilled in the art to which it appertains to make and use the same.

It is known that for the manufacture of white clouded fluxes for glass compounds of zircon, tin, titanium, beryllium and similar elements are used, and it has been also proposed already to use at the same time materials containing fluorin as a clouding medium.

According to all processes known so far, it was however possible only to obtain pure white opaque glasses, enamels and glazes, if the preparations were artificially cleaned and made completely free from iron. By means of natural compounds which were used for the manufacture of the clouding material and even by means of preparations which were only partly freed from iron, only smouched fluxes were obtained, even when discoloring agents were added.

The present invention renders it possible to use natural compounds of zircon, tin, beryllium, titanium, wolfram, tantalum, thorium and the rare earths for pure white clouded glass fluxes. As suitable earths may be mentioned the compounds of cerium, scandium, gallium, germanium, yttrium, ytterbium, lanthanum. Now the impure natural ores or minerals, or the semimanufactures thereof, which still contain some iron or other coloring impurities, as well as less thoroughly cleaned semi-manufactures may be used, and a pure white covering enamel or similar glaze be obtained. This surprising success is attained by working the mentioned primary preparations for the clouding substance directly with fluorids into the enamel frit or the glaze-batch. Care is to be taken to use sufficiently large amounts of fluorids, for instance alkalifluorids, silicofluords of alkalis, calciumfluorid, natural or artificial cryolite or fluorin compounds. The success of the method is only realized, if there are enough fluorids present, which has not been observed hitherto. A corresponding frit of soda, clay, feldspar, quartz, natural zirconia and silico fluorid of sodium is for instance made in the following proportions:

20 parts of quartz,
35 parts of feldspar,
10 parts of soda,
5 parts of magnesium carbonate,
10 parts of crude zirconia,
20 parts of silico fluorid of sodium.

The cause of the success that a pure white glass is obtained, and which has not heretofore been foreseen, might perhaps depend on a volatilization of the iron through the fluorids. Besides there must be sufficient silica present.

Owing to the larger quantity of fluorids the finished enamel has beside a good covering power also an easy fusibility, a brighter glaze, and great chemical and thermal resisting power. The different batches are not liable to get hair-cracks or craze. Besides the glazes are not poisonous, therefore also suitable for cooking vessels.

Furthermore there is the advantage that the enamels made with zircon or the other mentioned metallic oxids or metallic compounds and fluorids adhere especially well, so that they are advantageous as a ground-enamel. They can also be directly enameled without a ground.

The invention makes it therefore easy to obtain clouded glazes and renders them cheaper, by making of a white opaque glass directly from the natural impure clouding materials, this white opaque glass moreover being in its whole behavior more favorable. Even if they remain a very long time in the fire, such glazes remain bright and do not get mat as do some fluor glazes.

Another technical and economical advantage is that borax and borids are not necessary or can be quite replaced without affecting the fluidity and stability of the glazes. With the new process it is possible to get clouded glazes for firing at low temperatures which do not craze and crack even if the ceramic bases, that are liable to be effected, and highly porous masses are used. Furthermore special discoloring agents as oxids, cobalt salts, selenium, etc., are not required.

But the most important is of course that the ores of the clouding elements can be directly used and need not be subjected to complicated and expensive chemical purification.

I claim:

1. The manufacture of white clouded glass, enamels and glazes, which comprises embodying unpurified clouding material in the glass, glaze or enamel with material containing sufficient fluorin to prevent discoloring.

2. The manufacture of white, clouded glass, enamels and glazes, which comprises forming glass, glaze or enamel rich in silica and adding thereto unpurified clouding materials and material containing fluorin sufficient to prevent discoloring.

3. The method, which comprises embodying in a silicic acid enamel, glaze or glass clouding materials containing iron as an impurity and sufficient material containing fluorin to combine with the iron present, thereby preventing discoloring due to the presence of iron.

4. The method which comprises embodying in a silicic acid batch of glass, enamel or glaze, unpurified clouding materials and sufficient fluorid of a metal whose hydroxid is an alkali to prevent discoloring.

In testimony that I claim the foregoing as my invention, I have signed my name in presence of two subscribing witnesses.

EDUARD RIETZ.

Witnesses:
 EMIL HAGER,
 EDUARD SIEBRAND.